(12) United States Patent
Klemets

(10) Patent No.: US 7,162,533 B2
(45) Date of Patent: Jan. 9, 2007

(54) SESSION DESCRIPTION MESSAGE EXTENSIONS

(75) Inventor: Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 110 days.

(21) Appl. No.: 10/836,141

(22) Filed: Apr. 30, 2004

(65) Prior Publication Data

US 2005/0262187 A1 Nov. 24, 2005

(51) Int. Cl.
*G06F 15/16* (2006.01)

(52) U.S. Cl. ............... 709/231; 709/236; 709/233; 709/228; 725/105

(58) Field of Classification Search ........... 709/223, 709/201, 230, 231, 207; 713/181, 318; 719/318; 370/327; 707/10, 104.1
See application file for complete search history.

(56) References Cited

U.S. PATENT DOCUMENTS

| | | | |
|---|---|---|---|
| 4,963,995 A | 10/1990 | Lang | |
| 5,057,932 A | 10/1991 | Lang | |
| 5,132,964 A | 7/1992 | Esaki | |
| 5,164,839 A | 11/1992 | Lang | |
| 5,262,875 A | 11/1993 | Mincer et al. | |
| 5,440,334 A | 8/1995 | Walters et al. | |
| 5,568,181 A | 10/1996 | Greenwood et al. | |
| 5,710,970 A | 1/1998 | Walters et al. | |
| 5,758,076 A | 5/1998 | Wu et al. | |
| 5,787,472 A | 7/1998 | Dan et al. | |
| 5,835,495 A | 11/1998 | Ferriere | |
| 5,872,920 A | 2/1999 | Hausman et al. | |
| 5,890,010 A | 3/1999 | Nishigami | |
| 5,913,038 A | 6/1999 | Griffiths | |
| 5,931,961 A | 8/1999 | Ranganathan et al. | |
| 5,963,202 A | 10/1999 | Polish | |
| 5,978,567 A | 11/1999 | Rebane et al. | |
| 5,983,263 A | 11/1999 | Rothrock et al. | |
| 5,995,705 A | 11/1999 | Lang | |
| 5,996,015 A | 11/1999 | Day et al. | |
| 6,005,621 A | 12/1999 | Linzer et al. | |
| 6,014,706 A | 1/2000 | Cannon et al. | |
| 6,041,345 A | 3/2000 | Levi et al. | |
| 6,054,943 A | 4/2000 | Lawrence | |
| 6,111,567 A | 8/2000 | Savchenko et al. | |
| 6,118,817 A | 9/2000 | Wang | |
| 6,120,149 A | 9/2000 | Hosoi | |
| 6,161,201 A | 12/2000 | Payne et al. | |
| 6,195,692 B1 | 2/2001 | Hsu | |
| 6,209,041 B1 | 3/2001 | Shaw et al. | |
| 6,216,163 B1 | 4/2001 | Bharali et al. | |
| 6,262,990 B1 | 7/2001 | Ejiri | |
| 6,272,148 B1 | 8/2001 | Takagi et al. | |
| 6,292,834 B1 | 9/2001 | Ravi et al. | |
| 6,314,492 B1 | 11/2001 | Allen et al. | |
| 6,327,421 B1 | 12/2001 | Tiwari et al. | |

(Continued)

OTHER PUBLICATIONS

Paknikar, S., et al., "A Caching and Streaming Framework for Multimedia," ACM Multimedia 2000 Los Angeles CA; ACM 2000 1-58113-198-4/00/10; pp. 13-20.

(Continued)

*Primary Examiner*—Jeffrey Pwu
(74) *Attorney, Agent, or Firm*—Lee & Hayes, PLLC

(57) ABSTRACT

Session description message extensions include information describing a multimedia presentation or a single media presentation. The session description message is typically sent from one device to another device to which the multimedia or single media presentation will be streamed. Several extensions are described that extend the information that can be included in the session description message.

39 Claims, 4 Drawing Sheets

U.S. PATENT DOCUMENTS

| | | |
|---|---|---|
| 6,329,165 B1 | 12/2001 | Chattoraj et al. |
| 6,343,298 B1 | 1/2002 | Savchenko et al. |
| 6,385,647 B1 | 5/2002 | Willis et al. |
| 6,405,256 B1 | 6/2002 | Lin et al. |
| 6,421,348 B1 | 7/2002 | Gaudet et al. |
| 6,449,269 B1 | 9/2002 | Edholm |
| 6,480,498 B1 | 11/2002 | Gaudet et al. |
| 6,502,135 B1 | 12/2002 | Munger et al. |
| 6,611,868 B1 | 8/2003 | Arutyunov |
| 6,614,763 B1 | 9/2003 | Kikuchi et al. |
| 6,643,259 B1 | 11/2003 | Borella et al. |
| 6,757,255 B1 | 6/2004 | Aoki et al. |
| 6,765,878 B1 | 7/2004 | Carlson |
| 6,772,375 B1 | 8/2004 | Banga |
| 6,779,043 B1 | 8/2004 | Crinion |
| 6,785,288 B1 | 8/2004 | Enns et al. ............... 370/401 |
| 6,952,424 B1 | 10/2005 | Bass et al. |
| 6,954,430 B1 | 10/2005 | Haglund |
| 6,990,070 B1 | 1/2006 | Aweya et al. |
| 7,007,090 B1 | 2/2006 | Spangler et al. |
| 2002/0047899 A1 | 4/2002 | Son et al. |
| 2002/0048448 A1 | 4/2002 | Daniels |
| 2002/0049817 A1 | 4/2002 | Drory et al. |
| 2002/0090027 A1 | 7/2002 | Karczewicz et al. |
| 2003/0018799 A1 | 1/2003 | Eyal et al. |
| 2003/0236902 A1 | 12/2003 | Weiss et al. |
| 2003/0236912 A1 | 12/2003 | Klemets et al. |
| 2004/0003101 A1 | 1/2004 | Roth et al. |
| 2004/0054912 A1* | 3/2004 | Adent et al. ............... 713/181 |
| 2004/0244010 A1* | 12/2004 | Kleyman et al. ........... 719/318 |

OTHER PUBLICATIONS

Guo, K., et al.; "RCache: Design and Analysis of Scalable, Fault Tolerant Multimedia Stream Caching Schemes," Scalability and Traffic Control in IP Networks, Proceedings of SPIE vol. 4526, (2001); 2001 SPIE, 786X/01. pp. 68-86.

Fielding R. et al, "Hypertext Transfer Protocol—HTTP/1.1," Network Working Group Request for Comments: 2616; The Internet Society (Jun. 1999); Category: Standards Track. pp. 1-176.

Schulzrinne, H., et al., "Real Time Streaming Protocol (RTSP)," Network Working Group Request for Comments: 2326; The Internet Society (Apr. 1998). pp. 1-92.

Jin, S., et al. "Accelerating Internet Streaming Media Delivery using Network-Aware Partial Caching," 2002 IEEE, pp. 153-160.

Muuss, M., "The Story of the PING Program," Oct. 18, 1999, retrieved on Apr. 6, 2004 from the Internet Archive at <http://web.archive.org/web/19991018225218/ftp.art.mil/~mike/ping.htm>, 3 pages.

Muuss, M., "The Research Interests of Mike Muuss," Oct. 8, 1999, retrieved on Apr. 6, 2004 from the Internet Archive <http://web.archive.org/web/19991008020453/ftp.art.mil/~mike/>, 2 pages.

Lai, K., et al., "Measuring Bandwidth," INFOCOM '99; Eighteenth Annual Joint Conference of the IEEE Computer and Communications Societies Proceedings; IEEE New York, NY, USA, Mar. 21, 1999, pp. 235-245.

Minshall, G., et al., "Application performance pitfalls and TCP's Nagle algorithm"; vol. 27, No. 4, Mar. 2000, pp. 36-44.

Hayes, D. A., et al., "Impact of Flow Control on quality of service driven packet scheduling disciplines," Proceedings of the 1999 IEEE International Conference on Control Applications, Kohala Coast, HI, Aug. 22, 1999; pp. 1454-1459.

Nishida, Y., et al., "Congestion Control Mechanism for TCP with Pacekt Pair Scheme," IEICE Transactions on Information and Systems, Institute of Electronics Information and Comm. Egn. Tokyo, JP, vol. E82-D, No. 4, Apr. 1999, pp. 854-862.

Khalil, K. M., et al., "Performance Considerations for TCP/IP in Wide Area Networks," IEEE 1994, pp. 166-175.

Moldeklev, K., et al., "How a Large ATM MTU Causes Deadlocks in TCP Data Transfers," IEEE/ACM Transactions on Networking, vol. 3, No. 4, Aug. 1995, pp. 409-422.

Shannon, C.E., "A Mathematical Theory of Communication," reprinted with corrections from The Bell System Technical Journal, vol. 27, pp. 379-423, 623-656, Jul. Oct. 1948, (pages renumbered as 1-55).

"TAPI 3.0 Connection and Media Services", Microsoft Windows 2000 Server, Copyright 1999, pp. 1-23.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content," Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327, The Internet Society, Apr. 1998, pp. 1-42.

"Advanced Systems Format (ASF) Specification," Revision 01.20.01e, Microsoft Corp., Sep. 2003, pp. i-vi and 1-93.

Schulzrinne, H., et al., "RTP: A Transport Protocol for Real-Time Applications," Network Working Group RFC: 3550, Jul. 2003, pp. 1-104.

Microsoft Computer Dictionary 5th Edition, p. 428.

Kamiyama N et al. "Renegotiated CBR transmission in interactive video-on-demand system", Multimedia Computing and Systems '97 Proceedings, IEEE International Conference, Ottawa ONT, Canada Jun. 3-6, 1997. pp. 12-19.

Petit G H et al. "Bandwidth resource optimization in ivdeo-on-demand network architectures", Community Networkign Integrated Multimedia Services to the Home, 1994, Proceedings of the 1st International Workshop on San Francisco, CA Jul. 13-14, 1994, pp. 91-97.

Dutta A et al. "A Streaming architecture for next generation internet", ICC 2001, 2001 IEEE International Conference on Communications. Helsinky, Finland, Jun. 11-14, 2001, 1303-1309.

Lixin Gao et al. "Supplying instantaneous video-on-demand services using controlled multicast", Multimedia Computing and Systems, 1999, IEEE International Conference on Florence, Italy Jun. 7,11, 1999, pp. 117-121.

Coulson, "A Distributed Object Platform Infrastructure for Multimedia Applications," Computer Communications, Jul. 1998, 27 pages, vol. 21, No. 9.

Nagle, "Congestion Control in IP/TCP Internetworks," RFC 896, Jan. 6, 1984, 8 pages.

Stevens, "TCP Slow Start, Congestion Avoidance, Fast Retransmit, and Fast Recovery Algorithms," RFC, Jan. 1997, 6 pages.

From the Internet: http://www.freesoft.org/CIE/Topics/83.htm, "TCP Protocol Overview," Connected: An Internet Encyclopedia, retrieved on May 31, 2000.

From the Internet: http:/www.scit.wlv.ac.uk/~jphb/comms/tcp.html, "Transmission Control Protocol," retreived on May 31, 2000.

* cited by examiner

SESSION DESCRIPTION MESSAGE EXTENSIONS

TECHNICAL FIELD

This invention relates to streaming media and data transfers, and particularly to session description message extensions.

BACKGROUND

Content streaming, such as the streaming of audio, video, and/or text is becoming increasingly popular. The term "streaming" is typically used to indicate that the data representing the media is provided over a network to a client computer on an as-needed basis rather than being pre-delivered in its entirety before playback. Thus, the client computer renders streaming content as it is received from a network server, rather than waiting for an entire "file" to be delivered.

The widespread availability of streaming multimedia content enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

The Session Description Protocol (SDP), Network Working Group Request for Comments (RFC) 2327, April 1998, is a text-based format used to describe properties of a multimedia presentation, referred to as a "session", and properties of one or more media streams contained within the presentation. SDP has been developed as an application level protocol intended for describing multimedia sessions for the purposes of session announcement, session invitation, and other forms of multimedia session initiation. SDP can be used in accordance with other protocols, such as the Real-Time Streaming Protocol (RTSP) or the HyperText Transfer Protocol (HTTP), to describe and/or negotiate properties of a multimedia session used for delivery of streaming data.

SDP, however, is limited in the properties of the multimedia presentation that can be described. One solution to such limitations is to embed a different file header, such as an ASF (Advanced Streaming Format or Advanced Systems Format) file header, within an SDP message. Such a solution is described, for example, in U.S. Patent Application Ser. No. 2003/0236912, entitled "System and Method for Embedding a Streaming Media Format Header Within a Session Description Message". However, embedding such a file header can create problems, such as requiring the recipient of such an SDP message to be able to parse and understand the different file header, and increasing the size of the SDP message that includes the different file header. Thus, it would be beneficial to have a way to overcome these limitations of SDP without requiring recipients to be able to parse and understand an embedded different file header (such as ASF).

SUMMARY

Session description message extensions are described herein. These extensions extend the information that can be included in a session description message for streaming media.

In accordance with certain aspects, the session description message extensions include one or more of: a mutual exclusivity extension that specifies which of multiple media streams of a multimedia (or single media) presentation are mutually exclusive, a marker extension that specifies an index into a multimedia presentation, a script command extension that specifies data that is to be presented during playback of a multimedia presentation, a leaky bucket extension that specifies how much data of a multimedia presentation to buffer when playing the multimedia presentation at a particular bit rate, a caching information extension that specifies information about caching of a multimedia presentation, an encapsulation extension that specifies codec parameters for one or more of a plurality of different codecs, a bandwidth sharing extension that specifies media streams of a multimedia presentation that share bandwidth, or a stream prioritization extension that specifies which media streams of a multimedia presentation should have priority over which other media streams of the multimedia presentation.

BRIEF DESCRIPTION OF THE DRAWINGS

The same numbers are used throughout the document to reference like components and/or features.

DETAILED DESCRIPTION

Session description message extensions are described herein. A session description message includes information describing a multimedia presentation or a single media presentation. The session description message is typically sent from a server device to a client device to which the multimedia presentation will be streamed. Several extensions are described herein that extend the information that can be included in the session description message.

Figure 1:
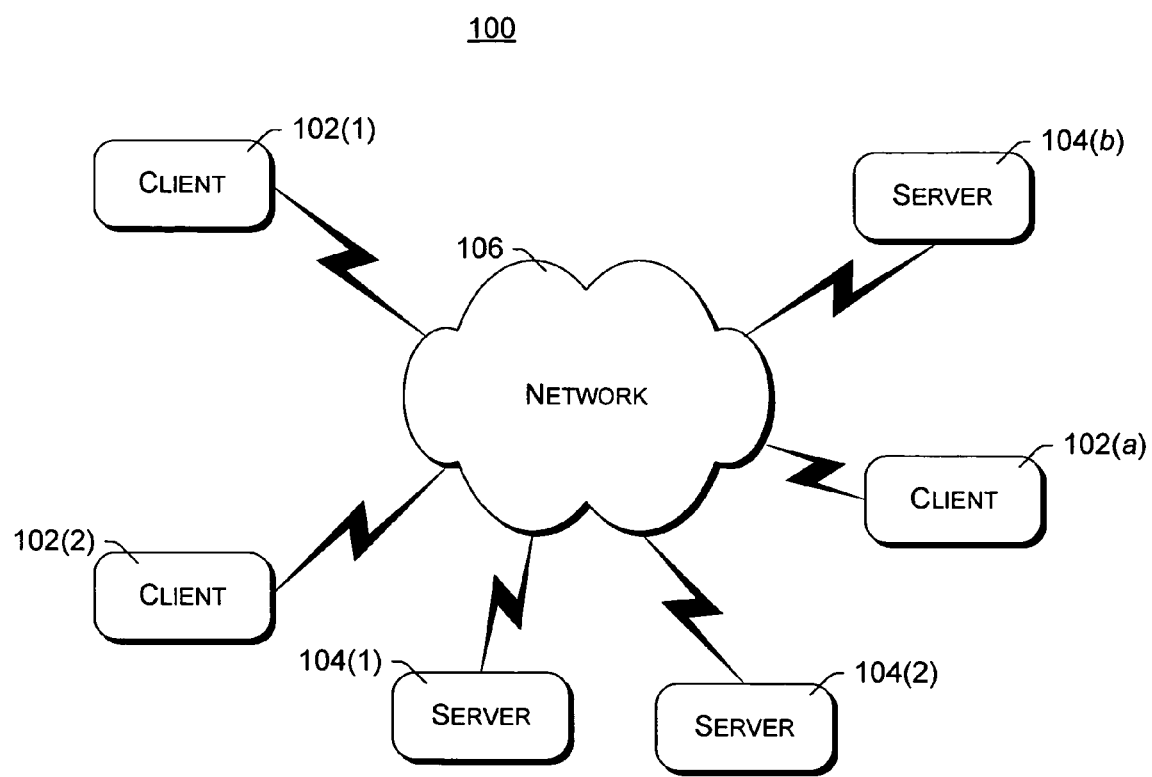
FIG. 1 illustrates an example network environment that can be used to stream media using the session description message extensions described herein.

FIG. 1 illustrates an example network environment 100 that can be used to stream media using the session description message extensions described herein. In environment 100, multiple (a) client computing devices 102(1), 102(2), . . . , 102(a) are coupled to multiple (b) server computing devices 104(1), 104(2), . . . , 104(b) via a network 106. Network 106 is intended to represent any of a variety of conventional network topologies and types (including wired and/or wireless networks), employing any of a variety of conventional network protocols (including public and/or proprietary protocols). Network 106 may include, for example, the Internet as well as possibly at least portions of one or more local area networks (LANs).

Computing devices 102 and 104 can each be any of a variety of conventional computing devices, including desktop PCs, workstations, mainframe computers, Internet appliances, gaming consoles, handheld PCs, cellular telephones, personal digital assistants (PDAs), etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety (e.g., providing the data on an as-needed basis rather than pre-delivering the data in its entirety before playback). The data may be publicly available or alternatively restricted (e.g., restricted to only certain users, available only if the appropriate fee is paid, etc.). The data may be any of a variety of one or more types of content, such as audio, video, text, animation, etc. Additionally, the data may be pre-recorded or alternatively "live" (e.g., a digital representation of a concert being captured as the concert is performed and made available for streaming shortly after capture).

A client device 102 may receive streaming media from a server 104 that stores the streaming media content as a file, or alternatively from a server 104 that receives the streaming media from some other source. For example, server 104 may receive the streaming media from another server that stores the streaming media content as a file, or may receive the streaming media from some other source (e.g., an encoder that is encoding a "live" event).

As used herein, streaming media refers to streaming one or more media streams from one device to another (e.g., from a server device 104 to a client device 102). The media streams can include any of a variety of types of content, such as one or more of audio, video, text, and so forth.

Figure 2:
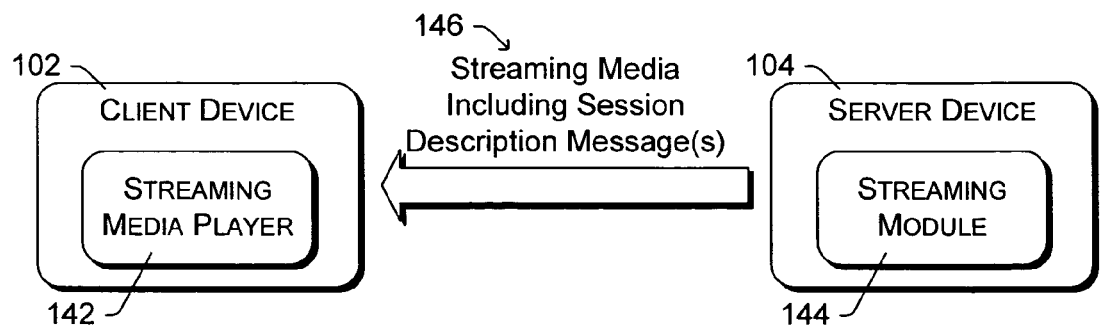
FIG. 2 illustrates example client and server devices that can stream media content using the session description message extensions described herein.

FIG. 2 illustrates example client and server devices that can stream media content using the session description message extensions described herein. Client device 102 includes a streaming media player 142 configured to access a streaming module 144 of server device 104. Media content including session description message(s) 146 is streamed from streaming module 144 to streaming media player 142, where the steaming media can be presented to a user of client device 102. The streaming media 146 can be streamed in accordance with different protocols, such as the Real-Time Streaming Protocol (RTSP) or the HyperText Transport Protocol (HTTP). Although not shown in FIG. 2, one or more additional devices (e.g., firewalls, routers, gateways, bridges, etc.) may be situated between client device 102 and server device 104.

One or more session description messages are used to describe properties of the multimedia presentation streamed as streaming media 146. Different media formats or protocols can be used for such session description messages. An example of such a media format is the Session Description Protocol (SDP), it Network Working Group Request for Comments (RFC) 2327, April 1998. In certain embodiments, the session description message discussed herein is a message in accordance with the SDP format described in RFC 2327.

Although different formats can be used to describe properties of the multimedia presentation, one or more session description messages are sent from streaming module 144 to streaming media player 142 that include identifier(s) of the properties. A single session description message may be sent by streaming module 144 for a particular multimedia presentation, or alternatively multiple session description messages may be sent. If multiple session description messages are sent, the multiple messages may include the same information, different information, or overlapping information.

A session description message includes, for example, one or more of: descriptions of each media stream available in the multimedia presentation (e.g., indicating the type of stream (e.g., video or audio), a bit-rate of each media stream, a language used in the stream, etc.); error correction information; security/authentication information; encryption information; or digital rights management (DRM) information; etc.

Figure 3:
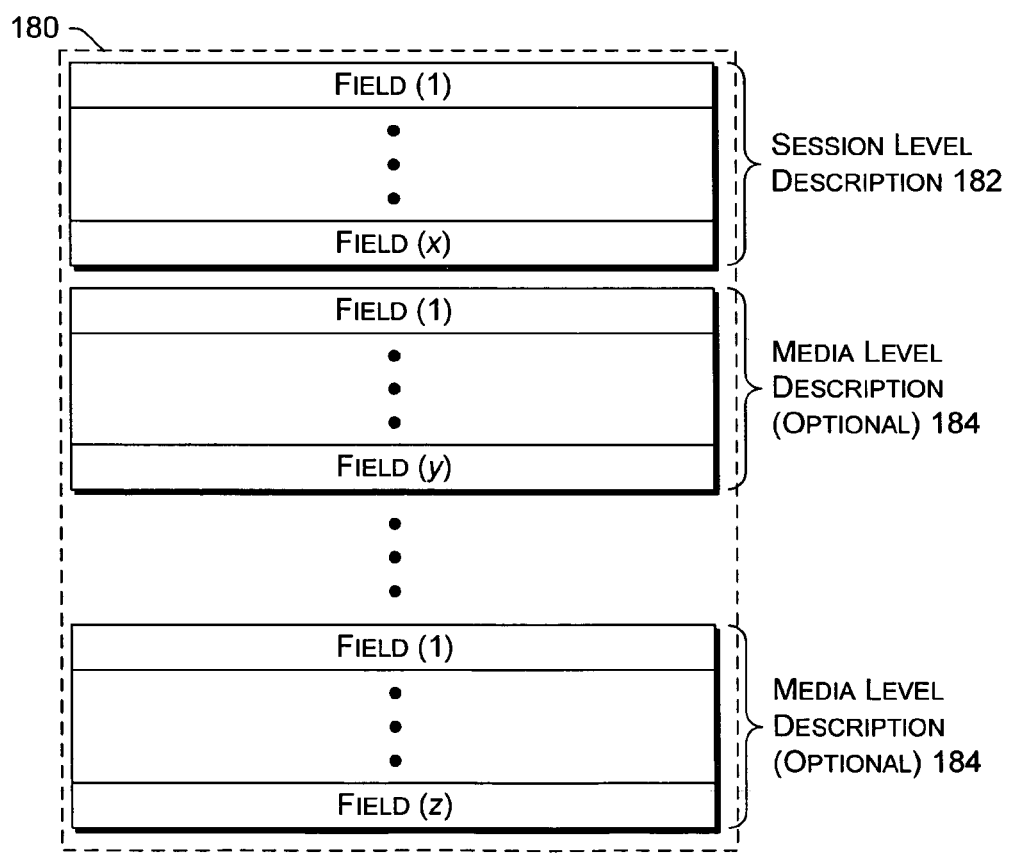
FIG. 3 illustrates an example session description message format.

FIG. 3 illustrates an example session description message format. Although illustrated as a specific example in FIG. 3, the session description message could have a format with fields or portions in different orders, or alternatively spread across different messages.

Session description message 180 includes a session level description portion 182 and zero or more media level description portions 184. Session level description portion 182 includes one or more fields having data that applies to the whole session and all media streams that are part of the session. Each media level description portion 182, on the other hand, includes one or more fields having data that applies only to a single media stream.

The data fields in media level description portion 182 describe properties for particular media streams. These properties may be in addition to properties described in session level description portion 182, or in place of properties described in session level description portion 182. For example, one or more properties in a particular media level description portion 182 may override, for the particular media stream associated with that particular media level description portion 182, properties identified in session level description portion 182.

Session description message 180, and the structure of message 180 is discussed in additional detail below specifically with respect to SDP. It is to be appreciated that these specific structures are only examples, and that the session description message can take different forms.

Session level description portion 182 begins with a particular field, referred to as the protocol version field. Similarly, media level description portions 184 each start with a particular field, referred to as a media name and transport address field. In certain embodiments, multiple fields of the same type may be included in a session description message (e.g., a single session description message may have two or more attribute fields).

Table I below illustrates example fields that may be included in session level description portion 182. Table I includes a name for each example field, an abbreviation or type for each example field, and a brief discussion of each example field. In certain embodiments, the protocol version field, the owner/creator and session identifier field, the session name field, and the time description field are required whereas all other fields in Table I are optional.

TABLE I

| Name | Type | Description |
|---|---|---|
| protocol version | v = | The version of the SDP. |
| origin | o = | The originator of the session (e.g., user name and address of the user's host), plus a session id and a session version number. |
| session name | s = | The name of the session. |
| session information | i = | Information about the session. |
| URI of description | u = | A pointer to additional information about the session. |
| email address | e = | Email address of person responsible for the session. |
| phone number | p = | Phone number of person responsible for the session. |

TABLE I-continued

| Name | Type | Description |
| --- | --- | --- |
| connection information | c = | Connection data describing the connection for the session, such as network type, type of addressing being used, and a connection address. |
| bandwidth information | b = | The proposed bandwidth to be used by the session. |
| time description | | See Table II below. |
| time zone adjustments | z = | Specifies adjustment times and offsets to allow for daylight-saving time. |
| encryption key | k = | Indicates the mechanism to be used to obtain an encryption key for the session by external means, or from an included encoded encryption key. |
| attribute | a = | Attribute of the session extending the SDP. |

Table II below illustrates the time description field in additional detail. Table II includes a name for each field in the time description field, an abbreviation or type for each field in the time description field, and a brief discussion of each field in the time description field. The time the session is active field is required whereas the zero or more repeat times field is optional.

TABLE II

| Name | Type | Description |
| --- | --- | --- |
| time the session is active | t = | The start and stop times for the session. |
| zero or more repeat times | r = | Specifies repeat times for the session. |

Table III below illustrates example fields that may be included in a media level description portion 184. Table III includes a name for each example field, an abbreviation or type for each example field, and a brief discussion of each example field. In certain embodiments, the media announcement field is required whereas all other fields in Table III are optional.

TABLE III

| Name | Type | Description |
| --- | --- | --- |
| media announcement | m = | The media type of the media stream, the transport port to which the media stream will be sent, the transport protocol for the media stream, and the media format(s) for the media stream. |
| media title | i = | Information about the media stream (e.g., a label for the media stream). |
| connection information | c = | Connection data describing the connection for the media stream, such as network type, type of addressing being used, and a connection address. |
| bandwidth information | b = | The proposed bandwidth to be used by the media stream. |
| encryption key | k = | Indicates the mechanism to be used to obtain an encryption key for the media stream by external means, or from an included encoded encryption key. |
| attribute | a = | Attribute of the media stream extending the SDP. |

In certain embodiments, the session description message extensions discussed herein are included as attribute fields in the session level description 182 and/or one or more media level descriptions 184.

Figure 4:
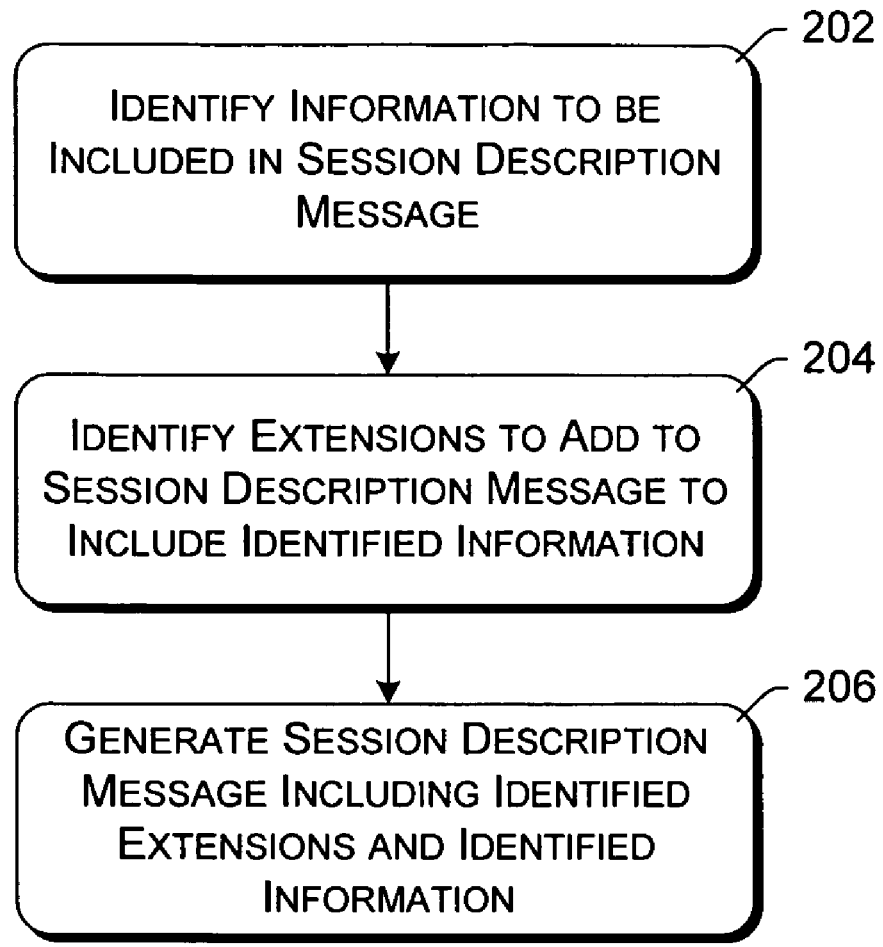
FIG. 4 is a flowchart illustrating an example process for extending a session description message for a multimedia presentation.

FIG. 4 is a flowchart illustrating an example process 200 for extending a session description message for a multimedia presentation. Process 200 may be performed in software, firmware, hardware, or combinations thereof. Process 200 is typically performed by a source of the multimedia presentation (e.g., an encoder device that is generating the multimedia presentation). For stored multimedia presentations, the information included in the session description message extensions is typically also stored along with the multimedia presentation or alternatively elsewhere. When the multimedia presentation is to be retrieved and streamed to a client device, the stored information can be retrieved and the session description message, with extensions, generated. For live multimedia presentations, the information included in the session description message is added to the session description message (e.g., by a human user or automatically by a computing device) at the beginning of the multimedia presentation and/or during the multimedia presentation (e.g., information may be added to or changed in the session description message as the live multimedia presentation changes).

Initially, the information to be included in the session description message is identified (act 202). This information can be identified in one or more different manners. One manner in which this information can be identified is retrieval from a file or record. In certain embodiments, at least some of the information is stored in a file or record associated with the multimedia presentation that the session description message is to describe. This file or record is accessed in act 202 to retrieve the information stored therein.

Another manner in which this information can be identified is receipt from a human user. In certain embodiments, at least some of the information is received from a human user. These user inputs are used in act 202 as at least some of the information to be included in the session description message.

Another manner in which this information can be identified is automatic detection. In certain embodiments, at least some of the information can be identified automatically by a computing device by analyzing the source of the multimedia presentation or the multimedia presentation itself. This automatically detected information is used in act 202 as at least some of the information to be included in the session description message.

The extensions to be added to the session description message in order to include all of the identified information are then identified (act 204). These extensions can be identified in different manners. One manner in which these extensions can be identified is automatically based on the identified information. In this manner, given the information that is identified, the particular extensions to be used to include that information in the session description message are automatically identified. For example, a table or record mapping information to extension may be accessed, the device performing the automatic configuration may be configured or programmed with the appropriate extensions for particular information, and so forth.

Another manner in which these extensions can be identified is identification of the extension information with the information itself. For example, when the information is identified in act 202, the information may also include the identification of which extension to use to include the information in the session description message.

The session description message is then generated including the extensions identified in act 204 and the information identified in act 202 (act 206). Once generated, the session description message can be sent to the client device to inform the client device of the information describing the multimedia presentation associated with the session description message.

A wide variety of information can be included in the session description message extensions. In certain embodiments, these extensions include information that would also be included in an ASF file header associated with the multimedia presentation. By using the session description message extensions to include such information, the ASF file header would not need to be communicated to the client device. This alleviates the need for the client device to be able to understand the ASF file header, can reduce the size of the session description message by not embedding the entirety of the ASF file header in the session description message, and can eliminate the need to generate an ASF file header in situations where an ASF file header has not already been generated.

It should be noted that the session description message extensions discussed herein are separate from the ASF file header. These session description message extensions are defined as being separate from any ASF file header (i.e., these session description message extensions are not simply part of an ASF file header that is embedded in a session description message). These session description message extensions can also be used in situations where there is no ASF file header associated with the multimedia presentation.

Table IV below is a summary of several extensions that can be included in a session description message. In certain embodiments, each of these extensions are added using an attribute field of the session description. The discussions of these extensions following Table IV indicate whether these extensions are typically found in session level description 182 or media level description 184, although alternatively these extensions could be located in either session level description 182 or media level description 184.

TABLE IV

| Name | Description |
| --- | --- |
| Mutual Exclusivity | Specifies whether media streams are mutually exclusive. |
| Marker | User-friendly indexes into the media stream(s). |
| Script Command | Specifies text (or other data) that is to be displayed or an identifier of a web page that should be displayed at a particular time during playback of the media stream(s). |
| Leaky Bucket | When playing back variable bit-rate content at a constant bit-rate, specifies how much data of the media stream(s) the client should buffer. |
| Caching Information | Specifies information about caching of the media stream(s), such as whether the stream(s) can be cached, how long the stream(s) are considered fresh, etc. |
| RTP Encapsulation | Specifies codec initialization parameters generically across a broad variety of codecs for data transmitted over RTP. |
| Bandwidth Sharing | Specifies streams that share bandwidth so that the maximum bandwidth of the set of specified streams is less than the sum of the maximum bandwidths of the individual streams. |
| Stream Prioritization | Specifies which streams should have priority over which other streams (e.g., which streams should or should not be dropped in the event of network congestion). |

Each of the extensions included in the summary of Table IV are described in the following in additional detail. Various example syntaxes are discussed below for the various extensions. It is to be appreciated that these are only examples, and that other syntaxes can alternatively be used. For example, the parameters or the order of the parameters may be changed. By way of another example, the names of specific attributes may be changed (e.g., the name for the mutual exclusivity attribute discussed below may be changed to something other than "a=group").

It should be noted that references are made herein to identifications of particular media streams. These identifications can be made at different times. In certain embodiments, identifiers of the media streams are created by an author or designer (or alternatively automatically) when the media stream is encoded (e.g., for a live broadcast) or when the media stream is stored (e.g., as an ASF file). In other embodiments, identifiers of the media streams are created when the streaming of the multimedia presentation (or single media presentation) from the server device begins.

The identifiers themselves can be generated in any of a variety of manners. In certain embodiments, the identifiers are identifiers of RTP sessions. In these embodiments, individual media streams are streamed from the server device to the client device using the Realtime Transport Protocol (RTP) as described in Network Working Group Request for Comments (RFC) 3550, July 2003. RTP provides end-to-end network transport functions suitable for applications transmitting real-time data, such as audio, video or simulation data, over multicast or unicast network services. Each media stream is streamed over a different RTP session. These RTP sessions can be assigned numbers in different manners, such as by using the "a=mid:" attribute as described in the Grouping of Media Lines in the Session Description Protocol (SDP) Network Working Group Request for Comments (RFC) 3388, December 2002. In other embodiments RTP sessions can be assigned numbers in different manners, such as by using an "a=stream:" attribute or some other attribute. Alternatively, the identifiers may be generated by simply using the same identifiers as the ASF Stream IDs, as assigned in the ASF file header.

Mutual Exclusivity

The mutual exclusivity extension specifies whether media streams are mutually exclusive. In certain implementations, streams are mutually exclusive based on bit rate and language. For example, a multimedia presentation may have multiple streams of the same content (e.g., audio or video) that are encoded at different bit rates. Only one of these streams at a time, having the desired bit rate, should be selected for streaming to the client device. By way of another example, a multimedia presentation may have multiple streams of the same content (e.g., audio) that are in different languages. Only one of these streams at a time, in the desired language, should be selected for streaming to the client device.

In certain embodiments, the parameters for the mutual exclusivity extension are obtained by accessing the Bitrate Mutual Exclusion Object or Advanced Mutual Exclusion Object in an ASF file header associated with the multimedia presentation. The parameters identified in the ASF file header are retrieved and used as the parameters of the mutual exclusivity extension. If there are multiple Bitrate Mutual Exclusion Objects and/or Advanced Mutual Exclusion Objects in the ASF file header, then a separate mutual exclusivity extension is included in the session description message for each of those multiple Bitrate Mutual Exclusion Objects and/or Advanced Mutual Exclusion Objects.

The mutual exclusivity extension is included in the session level description using an "a=group" attribute. The syntax for the "a=group" attribute is defined as follows:

*a*=group:ExclusionType StreamNumbers

The ExclusionType parameter can be set to different values to indicate the type of the mutual exclusivity. For example, the ExclusionType parameter may be set to "MBR" to indicate that the streams are mutually exclusive based on bit rate, but set to "LANG" to indicate that the streams are mutually exclusive based on language. In certain embodiments, when basing the mutual exclusivity extension on the information in an ASF file header, if the value of the "Exclusion Type" GUID in the Bitrate Mutual Exclusion Object or Advanced Mutual Exclusion Object of the ASF file header is ASF_Mutex_Language then the ExclusionType parameter is set to "LANG", and if the value of the "Exclusion Type" GUID in the Bitrate Mutual Exclusion Object or Advanced Mutual Exclusion Object of the ASF file header is ASF_Mutex_Bitrate then the ExclusionType parameter is set to "MBR".

The StreamNumbers parameter contains a list of streams that the mutual exclusion applies to. These streams are identified, for example, by their RTP sessions. In certain embodiments, when basing the mutual exclusivity extension on the information in an ASF file header, for each stream in the "Stream Numbers" field of the Bitrate Mutual Exclusion Object or Advanced Mutual Exclusion Object of the ASF file, the number assigned to the corresponding RTP session is added to the list of streams in the StreamNumbers parameter.

Marker

The marker extension specifies user-friendly indexes into the media stream(s). These user-friendly indexes are intended to be easily understood by human readers. The marker extension is included in the session level description using an "a=marker" attribute.

In certain embodiments, the parameters for the marker extension are obtained by accessing the Marker Object in an ASF file header associated with the multimedia presentation. The parameters identified in the ASF file header are retrieved and used as the parameters of the marker extension. If there are multiple Markers in the ASF file header, then a single marker extension can be used to identify all of the multiple Markers. Alternatively, a separate marker extension may be included in the session description message for each of those multiple Markers.

The syntax for the "a=marker" attribute is defined as follows:

$a$=marker:name time;desc

The name parameter specifies the name of the marker being specified by the marker extension. In certain embodiments, when basing the marker extension on the information in an ASF file header, the value of "Name" in the Marker Object of the ASF file header is UTF-8 encoded and used as the value of the name parameter in the marker extension.

The time parameter specifies the presentation time of the marker. In certain embodiments, when basing the marker extension on the information in an ASF file header, the value of "Presentation Time" in the Marker Object of the ASF file header is used as the value of the time parameter in the marker extension. In certain implementations, if the ASF file header specifies an amount of time to buffer data before starting to play the multimedia presentation (e.g., in the "Preroll" field of the File Properties Object), then that specified amount of time is subtracted from the value of "Presentation Time" in the Marker Object of the ASF file header, and the resulting difference is used as the value of the time parameter in the marker extension.

The desc parameter specifies the user-friendly index that is to be presented to the user as the marker. In certain embodiments, when basing the marker extension on the information in an ASF file header, the value of "Marker Description" in the Marker Object of the ASF file header is UTF-8 encoded and used as the value of the desc parameter in the marker extension.

The "a=marker" attribute may optionally include time and desc parameters for multiple markers. Each parameter pair is separated from the previous parameter pair by a space character (or alternatively by some other character(s), such as a comma, colon, period, etc.).

Script Command

The script command extension specifies text (or other data) that is to be displayed at a particular time during playback of the media stream(s), or specifies an identifier of a web page that should be displayed (e.g., within a web browser) at a particular time during playback of the media stream(s). The script command extension is included in the session level description using an "a=script" attribute.

In certain embodiments, the parameters for the script command extension are obtained by accessing the Script Command Object in an ASF file header associated with the multimedia presentation. The parameters identified in the ASF file header are retrieved and used as the parameters of the script command extension. If there are multiple Commands in the ASF file header, then a single script command extension can be used to identify all of the multiple Commands. Alternatively, a separate script command extension may be included in the session description message for each of those multiple Commands.

The syntax for the "a=script" attributes is defined as follows:

$a$=script:type time;command

The type parameter specifies the name of a type of command being specified by the script command extension. In certain embodiments, when basing the script command extension on the information in an ASF file header, the value of "Command Type Name" in the Script Command Object of the ASF file header is UTF-8 encoded and used as the value of the type parameter in the script command extension. If a Script Command Object in the ASF file header can contain multiple "Command Type Fields", then a separate script command extension is used for each such field.

The time parameter specifies the presentation time of the command. In certain embodiments, when basing the script command extension on the information in an ASF file header, the value of "Presentation Time" in the Script Command Object of the ASF file header is used as the value of the time parameter in the script command extension. In certain implementations, if the ASF file header specifies an amount of time to buffer data before starting to play the multimedia presentation (e.g., in the "Preroll" field of the File Properties Object), then that specified amount of time is subtracted from the value of "Presentation Time" in the Script Command Object of the ASF file header, and the resulting difference is used as the value of the time parameter in the script command extension.

The command parameter specifies the text (or other data) that is to be displayed or the identifier of the web page(s) that should be displayed (e.g., within a web browser). In certain embodiments, when basing the script command extension on the information in an ASF file header, the value of "Command Name" in the Script Command Object of the ASF file header is UTF-8 encoded and used as the value of the command parameter in the script command extension.

The "a=script" attribute may optionally include time and command parameters for multiple script commands. Each parameter pair is separated from the previous parameter pair by a space character (or alternatively by some other character(s), such as a comma, colon, period, etc.).

Leaky Bucket

The leaky bucket extension specifies, when playing back variable bit-rate content at a constant bit-rate, how much data of the media stream(s) the client should buffer. A leaky bucket refers to a buffer that empties at a constant positive leak rate, into which bits can be dumped at irregular times and in irregular amounts. A leaky bucket is specified by its leak rate (e.g., in bits per second) and its size or capacity (e.g., in bits). The leaky bucket extension is included in the session level description using an "a=bucketinfo" attribute.

In certain embodiments, the parameters for the leaky bucket extension are obtained by accessing the Extended Content Description Object in an ASF file header associated with the multimedia presentation. The Extended Content Description Object includes a name-value pair named "ASFLeakyBucketPairs". The value of the "ASFLeakyBucketPairs" name-value pair is the leaky bucket information, which is used as the parameters for the leaky bucket extension. Alternatively, the parameters for the leaky bucket extension may come from elsewhere in an ASF file header, such as the Extended Stream Description Object. If there are multiple such Extended Content Description Objects having "ASFLeakyBucketPairs" name-value pairs (and/or multiple such "ASFLeakyBucketPairs" name-value pairs within an Extended Content Description Object) in the ASF file header, then a single leaky bucket extension can be used to identify all of the multiple "ASFLeakyBucketPairs" name-value pairs. Alternatively, a separate leaky bucket extension may be included in the session description message for each of those multiple Extended Content Description Objects or multiple "ASFLeakyBucketPairs" name-value pairs.

The syntax for the "a=bucketinfo" attributes is defined as follows:

$a=bucketinfo:R1;B1R2;B2$

The R1 parameter specifies the bit rate (the leak rate) for the first leaky bucket, and the B1 parameter specifies the size (e.g., in milliseconds) of the first leaky bucket. The R2 parameter specifies the bit rate (the leak rate) for the second leaky bucket, and the B2 parameter specifies the size of the second leaky bucket. Although only two leaky buckets are shown in the syntax definition, the "a=bucketinfo" attribute may provide parameter pairs Rx;Bx for an unlimited number (x) of leaky buckets. Each parameter pair is separated from the previous pair by a space character (or alternatively some other character, such as a comma, colon, period, etc.).

In certain embodiments, when basing the leaky bucket extension on the information in an ASF file header, the value of the "ASFLeakyBucketPairs" name-value pair in the Extended Content Description Object of the ASF header file is used as the value of the R and B parameters in the leaky bucket extension. The first part of the "Descriptor Value" (e.g., the first four bytes) specifies the bit rate for the bucket (the R parameter), while the second part of the "Descriptor Value" (e.g., the second four bytes) specifies the size for the bucket (the B parameter).

Caching Information

The caching information extension specifies information about caching of the media stream(s), such as whether the stream(s) can be cached, how long the stream(s) are considered fresh, and so forth. In certain embodiments, the caching information is determined based on the caching policy implemented by the server device (e.g., server device 104). The caching information extension is included in the session level description using an "a=cachectrl" attribute.

The syntax of the "a=cachectrl" attribute is as follows:

$a=cachectrl:Rights$

The Rights parameter is one or more directives, separated by space characters (or alternatively some other characters, such as commas, periods, semicolons, colons, etc.). A directive can be either a name-value pair, where the name and the value are separated by an "=" character (or alternatively some other character), or a single "name", without a "value".

Different directives can be included in the Rights parameter. In certain embodiments, these directives include a no-cache directive, a no-splitting directive, and an expiration directive.

The no-cache directive is defined as "no-cache", and indicates to the client device, as well as any intermediate devices between the server and client devices, that the device is not allowed to cache the media stream(s) for playback at a later time.

The no-splitting directive is defined as "no-splitting", and indicates to the client device, as well as any intermediate devices between the server and client devices, that the device is not allowed to rebroadcast or redistribute the content. Splitting of streaming media content refers to the same content being communicated to multiple clients. The no-splitting directive indicate that such splitting is not allowed.

The "a=cachectrl" attribute may also include an expiration directive, which is a name-value pair that is defined as follows:

$expiration=Timeout$

The Timeout parameter specifies when cached copies of the media stream(s) are considered stale (no longer fresh). The Timeout parameter may specify a period of time (e.g., a number of seconds, minutes, days, etc.) until the cached copies are considered stale, or alternatively may specify a particular date and/or time (e.g., Apr. 15, 2004 at 3:00 pm) when the cached copies become stale. In certain embodiments, a device with a cached copy is not allowed to use stale media stream(s). In other embodiments, the device can use a stale cached copy of a media stream(s), but the device should attempt to determine if a newer version of the media stream(s) is available, and use that newer version instead if possible.

If the expiration directive is not included, then the media stream(s) do not become stale. If the "a=cachectrl" attribute is not included, then caching and splitting of the media stream(s) is allowed, and cached content does not become stale.

RTP Encapsulation

The RTP encapsulation extension specifies codec initialization parameters generically across a broad variety of codecs for data transmitted over RTP. A variety of different codecs can be used with RTP, and these different codecs oftentimes have their own encapsulation schemes and their own initialization parameters. The RTP encapsulation extension allows the same syntax (which is the RTP encapsulation extension) to describe the properties of a variety of different codecs, thereby alleviating the need for many different syntaxes to describe many different codes. The RTP encapsulation extension is included in the media level description using an "a=fmtp" attribute.

$a=fmtp:pt\ MIME\ config=config\text{-}info$

The pt parameter is the RTP payload type number, which identifies the format or type of the RTP payload. In certain implementations, any number between 0 and 127 is valid.

The MIME parameter is an identifier of the codec used in the media stream. In certain embodiments, the MIME parameter is a MIME (Multipurpose Internet Mail Extensions) type that is formed according to the rules in "WAVE and AVI Codec Registries", Network Working Group Request for Comments (RFC) 2361, June 1998. In other embodiments, the MIME parameter can take the following form:

application/vnd.asf;codec=xxxxxxxx-xxxx-xxxx-
xxxx-xxxxxxxxxxxx where the parameter xxxxxxxx-xxxx-xxxx-xxxx-xxxxxxxxxxxx is replaced by an identifier of the codec. In certain implementations, this identifier is the codec GUID from the ASF file. The identifier may be stored in the ASF file as, for example, the Media Type GUID from the Stream Properties Object in the ASF file, or the Type-Specific Data section of the Stream Properties Object in the ASF file.

The config=config-info parameter identifies the codec initialization data, where config-info is replaced by a series of sub-parameters. In certain implementations, the sub-parameters are Base64 encoded. These sub-parameters are separated by "/" characters, or alternatively other characters (e.g., periods, commas, colons, semi-colons, etc.). The syntax of config-info is as follows:

MajorType/FixedSizeSamples/TemporalCompression/
SampleSize/FormatType/FormatData The MajorType sub-parameter is an identifier (e.g., a GUID (Globally Unique ID)) that identifies the type of the media stream. In certain implementations, valid values include "73647561-0000-0010-8000-00AA00389B71" for an audio stream, and "73646976-0000-0010-8000-00AA00389B71" for a video stream.

The FixedSizeSamples sub-parameter indicates whether the codec uses fixed size samples (packets). In certain implementations, the FixedSizeSamples sub-parameter is "1" if the codec uses fixed size media samples (packets), or "0" otherwise. For example, usually this field will be "1" for audio and uncompressed video, but "0" for compressed video.

The TemporalCompression sub-parameter indicates whether the stream uses temporal compression. In certain implementations, the TemporalCompression sub-parameter is "1" if the stream uses temporal compression, meaning that not all media samples are "key-frames". Otherwise, it is set to "0". This field may be set to "1" for many types of compressed video, because such streams may have non-key frame media samples.

The SampleSize sub-parameter indicates the size of the media samples when the codec uses fixed size samples (packets). In certain implementations, the SampleSize sub-parameter is a decimal number which gives the size of the media samples when FixedSizeSamples is "1". The SampleSize sub-parameter can be set to "0", and should be ignored, when FixedSizeSamples is "0".

The FormatType sub-parameter is an identifier (e.g., a GUID) that identifies the format of the FormatData sub-parameter. The FormatData sub-parameter is the codec initialization data identified by the FormatType sub-parameter. Any of a variety of different structures that describe properties of a codec can be used for the FormatData sub-parameter. For example, the data structure describing properties of a codec for an audio stream may include information about the audio sample rate and the number of bits per sample. By way of another example, the data structure describing properties of a codec for a video stream may include information about the width and height (e.g., in pixels) of the video information, as well as the pixel aspect ratio. In certain implementations, each byte in the codec initialization data is represented as two hexadecimal digits in SDP. Alternatively, other representations may be used such as Base64 encoding.

Bandwidth Sharing

The bandwidth sharing extension specifies streams that share bandwidth in such a way that the maximum bandwidth of the set of specified streams is less than the sum of the maximum bandwidths of the individual specified streams. The bandwidth sharing extension is included in the session level description using an "a=bwshare" attribute.

In certain embodiments, the parameters for the bandwidth sharing extension are obtained by accessing the Bandwidth Sharing Object in an ASF file header associated with the multimedia presentation. The parameters identified in the ASF file header are retrieved and used as the parameters of the bandwidth sharing extension. If there are multiple Bandwidth Sharing Objects in the ASF file header, then a separate bandwidth sharing extension is included in the session description message for each of those multiple Bandwidth Sharing Objects.

The syntax for the "a=bwshare" attribute is defined as follows:

a=bwshare:SharingType R B SessionList

The SharingType parameter can be set to different values to indicate the type of sharing. For example, the SharingType parameter may be set to "PART" to indicate that any number of the specified streams may be streaming data at any given time, but set to "EXCL" if only one of the specified streams may be streaming data at any given time. In certain embodiments, when basing the bandwidth sharing extension on the information in an ASF file header, if the value of the "Sharing Type" GUID in the Bandwidth Sharing Object of the ASF file header is ASF_Bandwidth_Sharing_Partial then the SharingType parameter is set to "PART", and if the value of the "Sharing Type" GUID in the Bandwidth Sharing Object of the ASF file header is ASF_Bandwidth_Sharing_Exclusive then the SharingType parameter is set to "EXCL".

The R parameter specifies the leak rate (e.g., in bits per second) of a leaky bucket that contains the data portion of all of the streams without overflowing. The size of the leaky bucket is specified as the B parameter. In certain embodiments, when basing the bandwidth sharing extension on the information in an ASF file header, the R parameter is the value of the "Data Bitrate" field in the ASF file header, expressed as a decimal number.

The B parameter specifies the size (e.g., in milliseconds) of the leaky bucket. In certain embodiments, when basing the bandwidth sharing extension on the information in an ASF file header, the B parameter is the value of the "Buffer Size" field in the ASF file header, expressed as a decimal number.

The SessionList parameter consists of one or more decimal numbers, separated by space characters. Each number identifies one of the specified streams that is covered by the bandwidth sharing relationship expressed by this "a=bwshare" attribute. The streams are identified by their RTP session numbers.

Stream Prioritization

The stream prioritization extension specifies which streams in the multimedia presentation should have priority over which other streams. This prioritization can be used, for example, to identify which streams should or should not be dropped in the event of network congestion.

The stream prioritization extension is included in the session level description using an "a=prio" attribute. The "a=prio" attribute lists each RTP session in priority order, with the highest priority RTP session listed first. The "a=prio" attribute includes a list of parameters that are identifiers of the RTP sessions.

Certain RTP sessions can be identified as mandatory, which indicates that those certain sessions are not supposed to be dropped in response to network congestion. Mandatory RTP sessions are indicated in the "a=prio" attribute by appending the character 'm' after the RTP session number.

The following example illustrates the syntax of the "a=prio" attribute.

$a=prio:1m2m3$

In this example, RTP sessions 1 and 2 are mandatory. RTP session 3 has lower priority than the other sessions, and may be dropped in the event of network congestion.

In certain embodiments, the stream priorities are obtained by accessing the Stream Prioritization Object in an ASF file header associated with the multimedia presentation. The streams identified in the ASF file header correspond to RTP sessions, and the stream priorities identified in the ASF file header are used as the priorities for the corresponding RTP sessions. If the "Mandatory Flag" is set for a particular ASF stream, then the corresponding RTP session is also considered mandatory.

Figure 5:
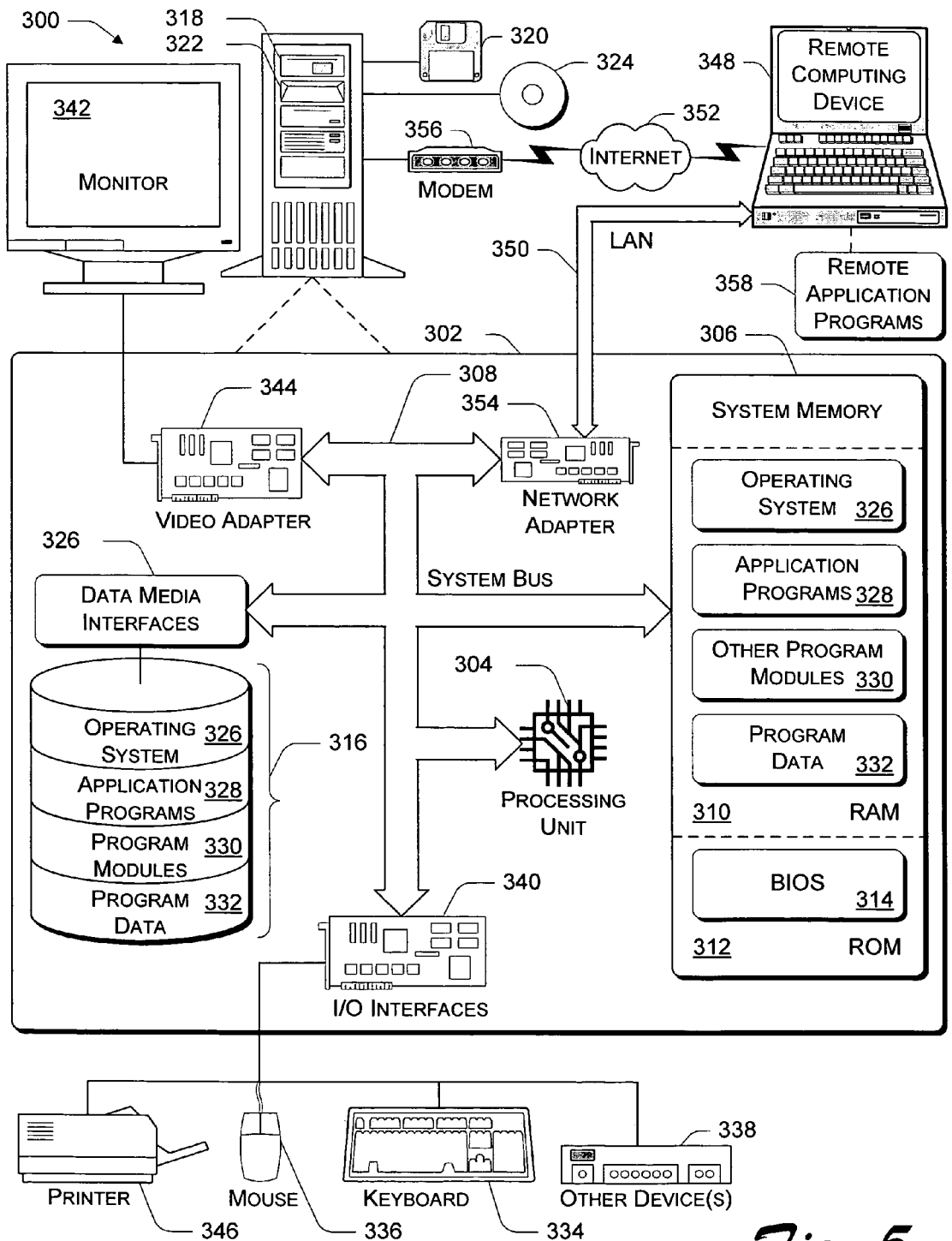
FIG. 5 illustrates a general computer environment, which can be used to implement the techniques described herein.

Referring now to FIG. 5, FIG. 5 illustrates a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, a client device 102 or server device 104 of FIGS. 1 and 2. Computer 302 can also be an encoder device that is the source of a multimedia presentation. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 5 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
  generating a session description message that describes properties of a multimedia presentation to be streamed to a client device, the multimedia presentation having a plurality of media streams, and the session description message having:
    a mutual exclusivity extension that is separate from an ASF file header and that specifies which of the plurality of media streams are mutually exclusive;
    a marker extension that is separate from the ASF file header and that specifies an index into the multimedia presentation;
    a script command extension that is separate from the ASF file header and that specifies data that is to be presented during playback of the multimedia presentation;
    a leaky bucket extension that is separate from the ASP file header and that specifies how much data of the multimedia presentation to buffer when playing the multimedia presentation at a particular bit rate;
    a caching information extension that is separate from the ASF file header and that specifies information about caching of the multimedia presentation;
    an encapsulation extension that is separate from the ASF file header and that specifies codec parameters for one or more of a plurality of different codecs;
    a bandwidth sharing extension that is separate from the ASF file header and that specifies media streams of the plurality of media streams that share bandwidth;
    a stream prioritization extension that is separate from the ASF file header and that specifies which of the plurality of media streams should have priority over which other of the plurality of media steams; and
  include, as part of data streamed to the client device, the session description message.

2. One or more computer readable media having stored thereon a plurality of instructions for generating a session description message that describes properties of a multimedia presentation to be streamed to a client device, the plurality of instructions, when executed by one or more processors, causing the one or more processors to:
  access an ASF file header of the multimedia presentation;
  identify a subset of a plurality of objects of the ASF file header;
  generate, for each object in the subset of the plurality of objects, a different one of a plurality of extensions for the session description, wherein one of the plurality of extensions comprises a leaky bucket extension that specifies how much data of the multimedia presentation to buffer when playing the multimedia presentation at a particular bit rate; and for each object in the subset of the plurality of objects:
retrieve one or more parameters from the object, and use the retrieved parameters as the parameters for one of the plurality of extensions.

3. One or more computer readable media as recited in claim 2, wherein one of the plurality of extensions comprises a mutual exclusivity extension that specifies which of a plurality of media streams of the multimedia presentation are mutually exclusive.

4. One or more computer readable media as recited in claim 2, wherein one of the plurality of extensions comprises a marker extension specifies an index into the multimedia presentation.

5. One or more computer readable media as recited in claim 2, wherein one of the plurality of extensions comprises a script command extension that specifies data that is to be presented during playback of the multimedia presentation.

6. One or more computer readable media as recited in claim 2, wherein one of the plurality of extensions comprises a caching information extension that specifies information about caching of the multimedia presentation.

7. One or more computer readable media as recited in claim 2, wherein one of the plurality of extensions comprises an encapsulation extension that specifics codec parameters for one or more of a plurality of different codecs.

8. One or more computer readable media as recited in claim 2, wherein one of the plurality of extensions comprises a bandwidth sharing extension that specifies media streams of a plurality of media streams of the multimedia presentation that share bandwidth.

9. One or more computer readable media as recited in claim 2, wherein one of the plurality of extensions comprises a stream prioritization extension that specifies which of a plurality of media streams of the multimedia presentation should have priority over which other of the plurality of media streams.

10. One or more computer readable media having stored thereon a plurality of instructions that, when executed by one or more processors, causes the one or more processors to:

generate a session description message that describes properties of a multimedia presentation to be streamed to a client device, the multimedia presentation having a plurality of media streams, and the session description message having a mutual exclusivity extension that is separate from an ASF file header and that specifies which of the plurality of media streams are mutually exclusive, and wherein a value ExclusionType represents a type of mutual exclusivity, a value StreamNumbers represents the media streams that are mutually exclusive, and the mutual exclusivity extension comprises:

a=group:ExclusionType StreamNumber; and include, as part of data streamed to the client device, the session description message.

11. One or more computer readable media as recited in claim 10, wherein the session description message is a Session Description Protocol (SDP) message.

12. One or more computer readable media as recited in claim 10, wherein the instructions that cause the one or more processors to generate the session description message further cause the one or more processors to:

identify an object of an ASF file header of the multimedia presentation;
retrieve one or more parameters from the object; and
analyze the retrieved one or more parameters to determine the parameters for the mutual exclusivity extension.

13. One or more computer readable media as recited in claim 10, wherein the plurality of media streams are mutually exclusive based on bit rate.

14. One or more computer readable media as recited in claim 10, wherein the plurality of media streams are mutually exclusive based on language.

15. One or more computer readable media having stored thereon a plurality of instructions that, when executed by one or more processors, causes the one or more processors to:

generate a session description message that describes properties of a multimedia presentation to be streamed to a client device, the multimedia presentation having a plurality of media streams, and the session description message having a marker extension that is separate from an ASF file header and that specifies an index into the multimedia presentation, and wherein a value name represents a name of a marker, a value time represents a presentation time of the marker, a value desc represents the index, and the marker extension comprises:

a=marker:name time; desc; and include, as part of data streamed to the client device, the session description message.

16. One or more computer readable media as recited in claim 15, wherein the session description message is a Session Description Protocol (SDP) message.

17. One or more computer readable media as recited in claim 15, wherein the instructions that cause the one or more processors to generate the session description message further cause the one or more processors to:

identify an object of an ASF file header of the multimedia presentation;
retrieve one or more parameters from the object; and
analyze the retrieved one or more parameters to determine the parameters for the marker extension.

18. One or more computer readable media having stored thereon a plurality of instructions that, when executed by one or more processors, causes the one or more processors to:

generate a session description message that describes properties of a multimedia presentation to be streamed to a client device, the multimedia presentation having a plurality of media streams, and the session description message having a script command extension that is separate from an ASF file header and that specifies data that is to be presented during playback of the multimedia presentation, and wherein a value type represents a type of command, a value time represents a presentation time of the multimedia presentation when the data is to be presented, a value command represents data to be displayed at the presentation time and the script command extension comprises:

a=script:type time; command; and include, as part of streaming data to be streamed to the client device, the session description message.

19. One or more computer readable media as recited in claim 18, wherein the session description message is a Session Description Protocol (SDP) message.

20. One or more computer readable media as recited in claim 18, wherein the instructions that cause the one or more processors to generate the session description message further cause the one or more processors to:

identify an object of an ASF file header of the multimedia presentation;

retrieve one or more parameters from the object; and analyze the retrieved one or more parameters to determine the parameters for the script command extension.

21. One or more computer readable media as recited in claim 18, wherein the script command extension specifies the data by including an identifier of a web page that has the data.

22. One or more computer readable media having stored thereon a plurality of instructions that, when executed by one or more processors, causes the one or more processors to:

generate a session description message that describes properties of a multimedia presentation to be streamed to a client device, the multimedia presentation having a plurality of media streams, and the session description message having a caching information extension that is separate from an ASF file header and that specifies information about caching of the multimedia presentation, and wherein a value rights represents the information about caching of the multimedia presentation, and the caching information extension comprises:

a=cachectrl:Rights; and include, as part of data streamed to the client device, the session description message.

23. One or more computer readable media as recited in claim 22, wherein the session description message is a Session Description Protocol (SDP) message.

24. One or more computer readable media as recited in claim 22, wherein the instructions that cause the one or more processors to generate the session description message further cause the one or more processors to:

identify an object of an ASF file header of the multimedia presentation;

retrieve one or more parameters from the object; and analyze the retrieved one or more parameters to determine the parameters for the caching information extension.

25. One or more computer readable media as recited in claim 22, wherein the information about caching of the multimedia presentation comprises information specifying whether the client device is allowed to cache the multimedia presentation.

26. One or more computer readable media as recited in claim 22, wherein the information about caching of the multimedia presentation comprises information specifying whether the client device is allowed to rebroadcast the multimedia presentation.

27. One or more computer readable media having stored thereon a plurality of instructions that, when executed by one or more processors, causes the one or more processors to:

generate a session description message that describes properties of a multimedia presentation to be streamed to a client device, the multimedia presentation having a plurality of media streams, and the session description message having an encapsulation extension that is separate from an ASF file header and that specifies codec parameters for one or more of a plurality of different codecs, and wherein a value pt represents a payload type number, a value MIME represents an identifier of one of the plurality of different codecs, a value config-info represents initialization data for the one of the plurality of different codecs, and the encapsulation extension comprises:

a=fmtp:pt MIME config=config-info; and include, as part of data streamed to the client device, the session description message.

28. One or more computer readable media as recited in claim 27, wherein the session description message includes a plurality of encapsulation extensions, each of the plurality of encapsulation extensions having the same syntax but being for a different one of the plurality of different codecs.

29. One or more computer readable media as recited in claim 27, wherein the session description message is a Session Description Protocol (SDP) message.

30. One or more computer readable media as recited in claim 27, wherein the instructions that cause the one or more processors to generate the session description message further cause the one or more processors to:

identify an object of an ASF file header of the multimedia presentation;

retrieve one or more parameters from the object; and analyze the retrieved one or more parameters to determine the parameters for the encapsulation extension.

31. One or more computer readable media as recited in claim 27, wherein the codec parameters include an identifier of a type of a media stream of the multimedia presentation that is to be decoded by the one or more codecs.

32. One or more computer readable media as recited in claim 27, wherein the codec parameters include an indication of whether the one or more codecs uses fixed size packets.

33. One or more computer readable media as recited in claim 32, wherein the codec parameters include an indication of the size of the fixed size packets.

34. One or more computer readable media as recited in claim 27, wherein the codec parameters include an indication of whether a media stream of the multimedia presentation that is to be decoded by the one or more codecs uses temporal compression.

35. One or more computer readable media as recited in claim 27, wherein the codec parameters include initialization data for the one or more codecs.

36. One or more computer readable media as recited in claim 35, wherein the codec parameters include a format of the initialization data in the session description message.

37. One or more computer readable media having stored thereon a plurality of instructions that, when executed by one or more processors, causes the one or more processors to:

generate a session description message that describes properties of a multimedia presentation to be streamed to a client device, the multimedia presentation having a plurality of media streams, and the session description message having a stream prioritization extension that is separate from an ASF file header and that specifies which of the plurality of media streams should have priority over which other of the plurality of media streams, and wherein the stream prioritization extension comprises a=prio followed by a list of media streams in priority order; and include, as part of data streamed to the client device, the session description message.

38. One or more computer readable media as recited in claim 37, wherein the session description message is a Session Description Protocol (SDP) message.

39. One or more computer readable media as recited in claim 37, wherein the instructions that cause the one or more processors to generate the session description message further cause the one or more processors to:

identify an object of an ASF file header of the multimedia presentation;

retrieve one or more parameters from the object; and analyze the retrieved one or more parameters to determine the parameters for the stream prioritization extension.

* * * * *